(12) United States Patent
Mordukhovich

(10) Patent No.: US 8,327,989 B2
(45) Date of Patent: Dec. 11, 2012

(54) CLUTCH REACTION PLATE

(75) Inventor: Gregory Mordukhovich, Bloomfield Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 421 days.

(21) Appl. No.: 12/637,809

(22) Filed: Dec. 15, 2009

(65) Prior Publication Data

US 2010/0175964 A1    Jul. 15, 2010

Related U.S. Application Data

(60) Provisional application No. 61/144,225, filed on Jan. 13, 2009.

(51) Int. Cl.
*F16D 13/64* (2006.01)
(52) U.S. Cl. .................. 192/52.3; 192/107 C; 192/70.14
(58) Field of Classification Search .............. 192/70.14, 192/52.3, 107 C
See application file for complete search history.

(56) References Cited

U.S. PATENT DOCUMENTS

| 2,135,126 | A |   | 11/1938 | Harwood |              |
|-----------|---|---|---------|---------|--------------|
| 2,172,503 | A |   | 9/1939  | Fies    |              |
| 2,256,709 | A | * | 9/1941  | Geyer   | 192/107 C    |
| 2,333,308 | A | * | 11/1943 | Goodwin | 192/107 C    |
| 2,587,837 | A | * | 3/1952  | Goodwin | 192/107 C    |
| 2,927,673 | A | * | 3/1960  | Sand    | 192/70.14    |
| 3,016,119 | A | * | 1/1962  | Rosenberger et al. | 192/70.14 |
| 5,226,516 | A | * | 7/1993  | Novikoff et al. | 192/70.28 |
| 2003/0150686 | A1 | * | 8/2003 | Kremer | 192/107 C |

FOREIGN PATENT DOCUMENTS

| CH | 342427 A | 11/1959 |
| DE | 706719 A | 6/1941 |
| DE | 966499 B | 8/1957 |

* cited by examiner

*Primary Examiner* — David D Le
*Assistant Examiner* — Lillian Nguyen

(57) ABSTRACT

A torque-transfer clutch includes a clutch reaction plate including an annular-shaped reaction element fixedly attached to a rigid plate element. The annular-shaped reaction element includes a preformed spring steel element and a plurality of undulations projecting orthogonal to a planar surface of the rigid plate element.

13 Claims, 1 Drawing Sheet

CLUTCH REACTION PLATE

CROSS-REFERENCE TO RELATED APPLICATIONS

This application claims the benefit of U.S. Provisional Application No. 61/144,225, filed Jan. 13, 2009, which is incorporated herein by reference.

TECHNICAL FIELD

This disclosure is related to clutch reaction plates for transferring torque.

BACKGROUND

The statements in this section merely provide background information related to the present disclosure and may not constitute prior art.

Power transmission devices can include clutch devices connected to rotating coaxial members to transfer torque. The clutch devices can be selectively applied by applying an urging force, i.e., a compressive force between a reaction plate that is fixedly connected to one of the rotating members and a friction plate that is fixedly connected to a second one of the rotating members. This can include brake clutch devices that connect rotating members to ground elements, e.g., a transmission case. The compressive force can be applied by a hydraulic piston device or another suitable force actuator.

Friction-induced vibration during clutch engagement can cause a shudder that is discernible to an operator. Amplitude of the shudder has been shown to decrease in a clutch pack having a plurality of reaction plates that have been matched in terms of surface geometries that include individual out-of-flatness surface eccentricities. A known clutch design practice includes designing a reaction plate that is as flat as achievable using known manufacturing processes including controlling reaction plate thickness and flatness. Tolerance for surface eccentricities resulting in out-of-flatness is limited by material conditions. This design specification includes a manufacturing process control consisting of NO-GO and GO function gages, including a predetermined gap between two parallel plates. Known processes for manufacturing reaction plates include metal stamping. It is known to use two different manufacturing processes to flatten reaction plates to minimize curving after stamping to achieve design specifications related to surface geometry. Known manufacturing processes include hydraulic compression of sheet metal before stamping to form the reaction plate and plate rolling after the stamping that forms the reaction plate.

Test results for reaction plates originating from a common manufacturing line ranged widely in ability to induce shudder. Shudder was shown to be induced under almost any conditions with specific reaction plates and induced only under very specific range of operating conditions with other reaction plates. Measured surface geometries of the tested reaction plates indicate differences in surface waviness form and amplitude. Batch-to-batch and in-batch variations have been studied and revealed waviness shape and amplitude variation. Such variation may lead to variation in stiffness and elastic response that can lead to load distribution and contact pressure variation. Under a compressive force the lower order spatial frequencies of the waviness may diminish, while higher order spatial frequencies may see only slight reduction in waviness. One worst case load distribution may come from a stiff, i.e., higher order plate with high amplitude waviness. A perfectly flat plate may be preferred for load distribution under a compressive force with a clutch apply-piston pressure on, however when the compressive force is released, i.e., the clutch apply-piston pressure off, the opposed reaction plate and friction plate may stick together due to the surface tension and continue to transfer torque, referred to as drag. When the reaction and friction plates are perfectly flat the drag-related losses may be maximized, because the average gap between plates is at a minimum.

It is known to add a spring element to separate the opposed reaction plate and friction plate when the compressive force is off, while relying on abrasive wear or elastic deformation of the friction material of the friction plates to maximize the actual area of contact of the parallel opposed reaction and friction plates when the compressive force is applied. A lower order waviness of the friction plate may act as the spring element. The friction plate waviness may act as a spring, which may lead to localized overloading of the friction material leading to excessive local plastic deformation, permeability loss, friction, temperature and, as result, to shudder. The waviness of the friction plate may lead to an excessive abrasive wear of the high pressure points with reduction of the clutch capacity until the waviness is worn away.

A reaction plate may be designed with a structural form and stiffness that is optimized by balancing the torque capacity and spinning losses for a given torque transfer, compressive force, elasticity of the friction material, clutch frictional characteristics, number of plates in a clutch pack, spline drag, design configuration, and whether the reaction plate is used as part of a rotational clutch or a stationary clutch, i.e., brake clutch.

SUMMARY

A torque-transfer clutch includes a clutch reaction plate including an annular-shaped reaction element fixedly attached to a rigid plate element. The annular-shaped reaction element includes a preformed spring steel element and a plurality of undulations projecting orthogonal to a planar surface of the rigid plate element.

BRIEF DESCRIPTION OF THE DRAWINGS

One or more embodiments will now be described, by way of example, with reference to the accompanying drawings, in which.

DETAILED DESCRIPTION

Figure 1:
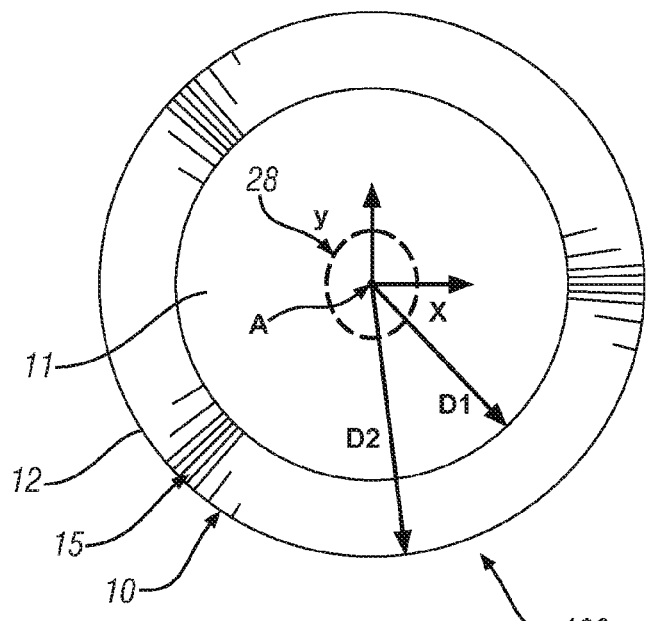
FIGS. 1 and 2 are two-dimensional schematic diagrams illustrating a torque-transfer clutch including a clutch reaction plate and an opposed friction plate in accordance with an embodiment of the present disclosure.
Figure 2:
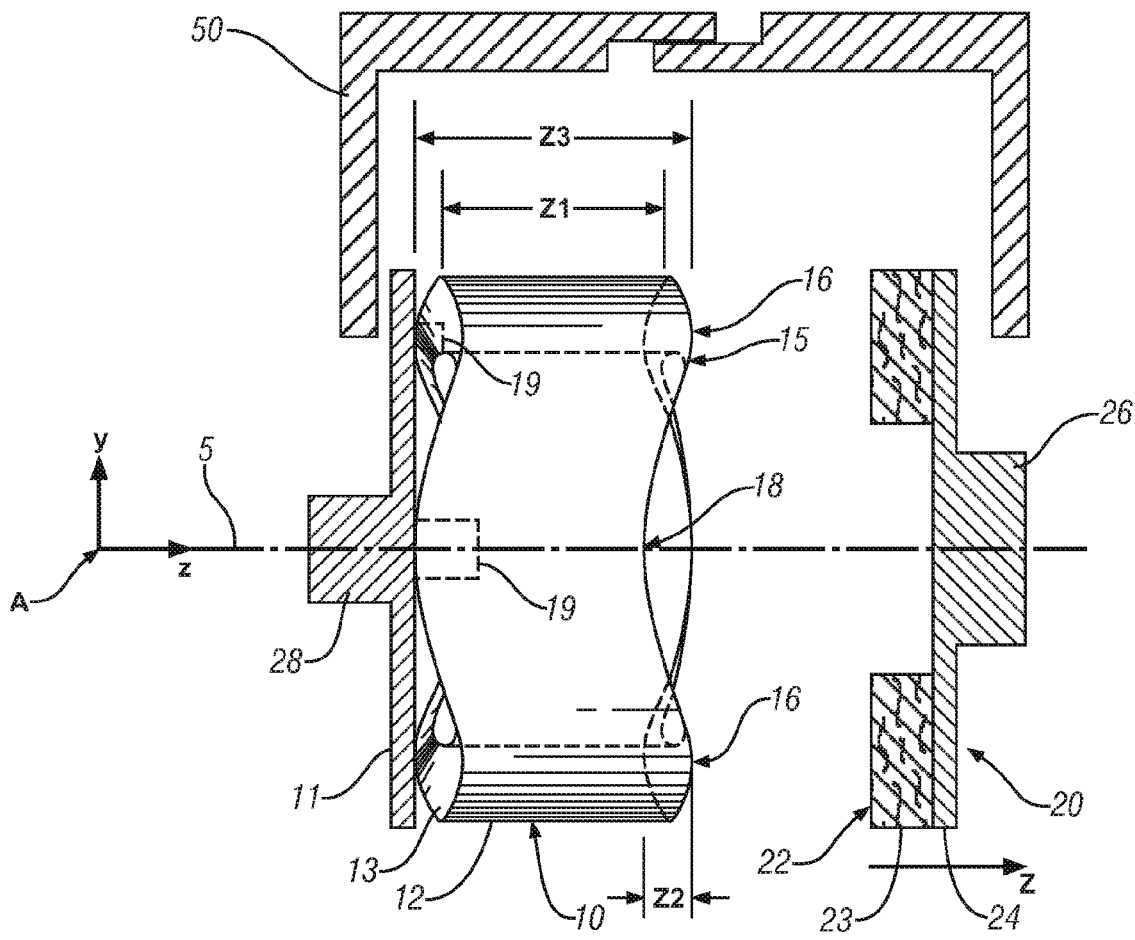

Referring now to the drawings, wherein the showings are for the purpose of illustrating certain exemplary embodiments only and not for the purpose of limiting the same, FIGS. 1 and 2 schematically illustrate a torque-transfer clutch 100 including a clutch reaction plate 10 and a friction plate opposing the clutch reaction plate 10, referred to as an opposed friction plate 20. In one embodiment a piston device 50 is configured to apply compressive force to the clutch reaction plate 10 and the opposed friction plate 20 to effect torque transfer thereacross. Orthogonal coordinate axes are depicted, including x, y, and z axes having a common locus A. Like numerals refer to like elements in the various figures.

FIG. 1 is two-dimensional schematic view of the exemplary clutch reaction plate 10 of the torque-transfer clutch 100 in the x-y plane. The clutch reaction plate 10 has a preferred, uncompressed form including an annular-shaped reaction element 12 fixedly attached to and mounted on a rigid plate element 11. The annular-shaped reaction element 12 is fixedly attached to the rigid plate element 11 using a plurality of rivets 19 or another suitable attaching mechanism. The rigid plate element 11 is preferably formed from steel and is coaxial to and rotatably coupled to an input member 28 to transfer torque. The reaction element 12 is an annular element constructed from spring steel or steel alloy. The reaction element 12 has an inner diameter D1 and an outer diameter D2 and includes an interference surface 15, and a first surface 13 shown with reference to FIG. 2.

FIG. 2 shows a corresponding two-dimensional schematic view of the torque transfer clutch 100 including the clutch reaction plate 10 and the corresponding friction plate 20, depicted in the y-z plane. The clutch reaction plate 10 includes the rigid plate element 11 and the reaction element 12 including the interference surface 15. The interference surface 15 compressively couples to the friction plate 20 to effect torque transfer when the piston device 50 is controlled to apply compressive force thereto. The rigid plate element 11 is preferably substantially planar in the z direction.

The friction plate 20 is rotatably coupled to an output member 26, both of which are coaxial to the clutch reaction plate 10 on the z-axis 5. The friction plate 20 includes a rigid plate element 24, preferably formed from steel, on which friction material 23 is fixedly attached. The friction material 23 preferably includes an annular-shaped friction surface 22 that is substantially flat in the x-y plane and corresponds to the interference surface 15 of the reaction element 12 of the clutch reaction plate 10. The interference surface 15 of the reaction element 12 interferes with the friction surface 22 of the friction plate 20 when the compressive force is applied thereto to translate the reaction plate 10 in the z dimension. It is understood that the friction plate 20 may be fixedly attached to a transmission case when the torque transfer clutch 100 is configured as a brake clutch device. Design elements for friction plate 20 are understood by those having ordinary skill in the art.

The reaction element 12 of the clutch reaction plate 10 is preferably preformed with a plurality of undulations. The reaction element 12 is of a thickness and material/surface treatment that permits elastic deformation and flattening of the reaction element 12 against the friction surface 22 of the friction plate 20 when the compressive force is applied, e.g., from the controllable piston device 50. This can increase actual surface contact area between the clutch reaction plate 10 and the friction plate 20.

The reaction element 12 exerts a restoring spring force against the rigid plate element 11 and the friction plate 20 to separate the rigid plate element 11 from the friction plate 20 when the compressive force is released, preferably returning the reaction element 12 to its original, uncompressed form.

In the embodiment shown, the reaction element 12 includes the plurality of undulations projecting in the z-direction of the interference surface 15, i.e., orthogonal to the x-y plane defined by the planar surface of the rigid plate element 11. The undulations are preferably formed in a continuous and uninterrupted manner about the complete circumference of the reaction element 12. The reaction element 12 further includes undulations in the first surface 13 that correspond to the undulations in the interference surface 15. The undulations in the interference surface 15 include a plurality of arches 16 and valleys 18 described in relation to the z-axis 5. In one embodiment, as shown, there are three valleys 18 and three arches 16 on the interference surface 15.

The clutch reaction plate 10 including the reaction element 12 can be dimensionally characterized in the z-direction, preferably when the reaction element 12 is in the uncompressed state. A first dimension Z1 describes a z-thickness of the material of the reaction element 12. In the embodiment of FIG. 1, the first dimension Z1 describing the z-thickness of the material of the reaction element 12 is preferably substantially constant in both a radial direction and a circumferential direction of the reaction element 12.

A second dimension Z2 describes a z-distance between a zenith of each of the arches 16 and a nadir of each of the valleys 18 of the reaction element 12. A third dimension Z3 describes a z-distance between the zenith of the arches 16 and a surface of the rigid plate element 11 on which the reaction element 12 is mounted.

Design elements of the exemplary reaction element 12 include a surface area of the interference surface 15, a torque transfer capability of the interference surface 15 defined in terms of the inner diameter D1 and the outer diameter D2, and deflection characteristics of the reaction element 12 considering compressive force and stress.

Transferred torque between the input member 28 and the output member 26 across the clutch 100 when the clutch reaction plate 10 is compressively applied to the friction plate 20 takes into account pressure distribution over the friction surfaces, i.e., the interference surface 15 of the reaction element 12 as applied to the friction surface 22 of the friction plate 20. Torque transfer (Tq) can be calculated as:

$$Tq=0.5*f*(D1+D2)*F_N \quad [1]$$

wherein f is the coefficient of friction and $F_N$ is a magnitude of compressive or normal force applied to the reaction element 12 across the clutch reaction plate 10 and the friction plate 20 using the piston device 50. Thus, for a given system, one having ordinary skill in the art can design the inner diameter D1 and the outer diameter D2 of the interference surface 15 of the reaction element 12 to achieve a desired or maximum torque transfer between the input member 28 and the output member 26. One having ordinary skill in the art can calculate the compressive or normal force $F_N$ associated with the desired torque to design load/deflection characteristics and material selection for the reaction element 12, taking into account design factors, dimensional constraints, and features of the clutch 100 and the associated transmission device. The preferred magnitude of compressive force $F_N$ is the magnitude of compressive force applied to the clutch reaction plate 10 and the opposed friction plate 20 that is required to effect torque transfer thereacross, and is determined based upon the torque transfer requirements of the specific clutch application. The design factors of the reaction element 12 include the first dimension Z1, i.e., thickness of the material of the reaction element 12, the second dimension Z2, i.e., z-distance between the zenith of each of the arches 16 and a nadir of each of the valleys 18 of the reaction element 12, and the third dimension Z3, i.e., the z-distance between the zenith of the arches 16 and a surface of the rigid plate element 11 on which the reaction element 12 is mounted, taking into account material characteristics such as modulus of elasticity. A preferred design for the reaction element 12 includes first dimension Z1, second dimension Z2, third dimension Z3 and a modulus of elasticity for the material thereof such that the reaction element 12 deforms to a substantially flattened shape in the z-direction when the compressive force $F_N$ is applied, causing the interference surface 15 of the reaction element 12 to completely physically contact the annular-shaped friction surface 22 of the friction plate 20 to transfer torque. The reaction element 12 preferably elastically deforms, i.e., it reforms to its original undulated uncompressed shape as the compressive or normal force $F_N$ is released. The reaction element 12 exerts the restoring spring force to reform to its undulated uncompressed form as the compressive or normal force $F_N$ is decreased and released. It is understood that torque transfer is described with reference to a single clutch reaction plate 10 and the friction plate 20, and is applicable to a clutch device having multiple clutch reaction plates 10 and multiple friction plates 20.

The reaction element 12 and the clutch reaction plate 10 achieve a preferred restoring spring force by controlling the aforementioned material properties and physical dimensions, including modulus of elasticity for the material thereof and the first dimension Z1, second dimension Z2, third dimension Z3. In one embodiment the reaction element 12 is constructed of steel or steel alloy preferably having a modulus of elasticity of about 2.12E+05 MPa. Preferably the reaction element 12 is designed to deform in the z-direction such that the interference surface 15 completely physically contacts the friction surface 22 of the friction plate 20 when the compressive or normal force $F_N$ is applied to the clutch reaction plate 10 and the friction plate 20. Preferably the compressive or normal force $F_N$ is uniformly applied across the interference surface 15 and the friction surface 22.

The reaction element 12 deflects circumferentially when the compressive force $F_N$ is applied. The clutch reaction plate 10 includes the predetermined dimensional shape and restoring spring force for each application to achieve a substantially flat surface when the compressive force $F_N$ is applied to maximize surface area contact between the reaction element 12 and the friction surface 22 of the friction plate 20. An increase in the actual contact area associated with the circumferential deflection of the reaction element 12 can effect an increase in transferred torque when the clutch 100 is applied. An increase in the actual contact area can effect an increase in permissible clutch slippage time without localized overheating of the clutch friction plates 20.

The reaction element 12 returns to its uncompressed form to minimize surface area contact between the reaction element 12 and the friction surface 22 of the friction plate 20 when the compressive force $F_N$ is released. The restoring spring force exerted by the reaction element 12 urges the friction plate 20 away from the reaction element 12 when the compressive force $F_N$ is released, thus reducing the surface area contact. The transferred torque associated with open clutch spin losses decreases with decreases in the actual surface area contact.

The reaction element 12 acts as a spring having maximum compliance beyond a threshold level of the applied compressive force to achieve the maximum contact with the friction surface 22 of the friction plate 20. The restoring spring force of the reaction element 12 is substantial enough to overcome capillary adhesion occurring between the reaction element 12 and the friction surface 22 of the friction plate 20 and urge the plates apart, resulting in a minimum surface area contact in the x-y plane in a free state, i.e., when the applied compressive force has been released.

The disclosure has described certain preferred embodiments and modifications thereto. Further modifications and alterations may occur to others upon reading and understanding the specification. Therefore, it is intended that the disclosure not be limited to the particular embodiment(s) disclosed as the best mode contemplated for carrying out this disclosure, but that the disclosure will include all embodiments falling within the scope of the appended claims.

The invention claimed is:

1. A torque-transfer clutch, comprising:
    a clutch reaction plate including an annular-shaped reaction element fixedly attached to a rigid plate element; and
    the annular-shaped reaction element comprising a preformed spring steel element and including a plurality of undulations projecting orthogonal to a planar surface of the rigid plate element, wherein the plurality of undulations of the annular-shaped reaction element projecting orthogonal to the planar surface of the rigid plate element are continuous and uninterrupted about a complete circumference of the reaction element; wherein the annular-shaped reaction element deforms in response to a compressive force applied to the rigid plate element and an opposed friction plate such that an interference surface of the annular-shaped reaction element completely contacts a friction surface of the opposed friction plate.

2. The torque-transfer clutch of claim 1, wherein the annular-shaped reaction element elastically deforms to a substantially flattened surface in response to the compressive force.

3. The torque-transfer clutch of claim 2, wherein the annular-shaped reaction element exerts a restoring spring force to restore the plurality of undulations projecting orthogonal to the planar surface of the rigid plate element when the compressive force is released.

4. The torque-transfer clutch of claim 3, wherein the annular-shaped reaction element exerts the restoring spring force to restore the plurality of undulations projecting orthogonal to the planar surface of the rigid plate element to separate the clutch reaction plate from the opposed friction plate when the compressive force is released.

5. The torque-transfer clutch of claim 1, wherein the annular-shaped reaction element has a constant thickness around its circumference orthogonal to the planar surface of the rigid plate element.

6. The torque-transfer clutch of claim 1, wherein the annular-shaped reaction element deflects circumferentially when a compressive force is applied.

7. A torque-transfer clutch configured to transfer torque between an input member and an output member, comprising:
    the input member coupled to a clutch reaction plate including a reaction element fixedly attached to a rigid plate element;
    the output member coupled to an opposed friction plate opposing the clutch reaction plate;
    the reaction element comprising a preformed spring steel element and including a plurality of undulations projecting orthogonal to a planar surface of the rigid plate element, wherein the plurality of undulations of the annular-shaped reaction element projecting orthogonal to the planar surface of the rigid plate element are continuous and uninterrupted about a complete circumference of the reaction element;
    the opposed friction plate coaxial to the clutch reaction plate; and
    a device to apply a compressive force to the rigid plate element and the opposed friction plate to effect torque transfer thereacross.

8. The torque-transfer clutch of claim 7, wherein the reaction element elastically deforms in response to the compressive force such that an interference surface of the reaction element completely contacts a friction surface of the opposed friction plate.

9. The torque-transfer clutch of claim 8, wherein the reaction element elastically deforms to a substantially flattened surface in response to the compressive force.

10. The torque-transfer clutch of claim 9, wherein the reaction element exerts a restoring spring force to restore the plurality of undulations projecting orthogonal to the planar surface of the rigid plate element when the compressive force is released.

11. The torque-transfer clutch of claim 10, wherein the reaction element exerts the restoring spring force to restore the plurality of undulations projecting orthogonal to the planar surface of the rigid plate element to separate the clutch reaction plate from the opposed friction plate when the compressive force is released.

12. The torque-transfer clutch of claim 7, wherein the reaction element has a constant thickness around its circumference orthogonal to the planar surface of the rigid plate element.

13. The torque-transfer clutch of claim 7, wherein the shaped reaction element deflects circumferentially when the compressive force is applied.

* * * * *